US008763631B2

(12) United States Patent
Mares et al.

(10) Patent No.: US 8,763,631 B2
(45) Date of Patent: Jul. 1, 2014

(54) GAS TURBINE METERING VALVE

(75) Inventors: E. Joseph Mares, Del Mar, CA (US);
Nathan Todd Miller, San Diego, CA
(US); Mark Robert Huebscher, San
Diego, CA (US)

(73) Assignee: **Precision Engine Controls
Corporation**, San Diego, CA (US)

( * ) Notice: Subject to any disclaimer, the term of this
patent is extended or adjusted under 35
U.S.C. 154(b) by 0 days.

(21) Appl. No.: 13/603,115

(22) Filed: Sep. 4, 2012

(65) Prior Publication Data
US 2013/0056096 A1 Mar. 7, 2013

Related U.S. Application Data

(63) Continuation of application No. 10/429,092, filed on May 3, 2003, now abandoned.

(51) Int. Cl.
*F02C 7/06* (2006.01)
*F16K 31/06* (2006.01)

(52) U.S. Cl.
USPC .... 137/487.5; 137/220; 251/118; 251/129.21

(58) Field of Classification Search
CPC . F16K 1/123; F16K 31/0651; F16K 31/0655;
F16K 31/0658; G05D 7/0635; G05D 7/0676;
F02C 9/263
USPC ............... 137/219, 487.5, 554, 220; 251/118,
251/123, 129.04, 129.21
See application file for complete search history.

(56) References Cited

U.S. PATENT DOCUMENTS

| 1,496,338 | A | | 6/1924 | Haley |
| 2,010,416 | A | | 8/1935 | Schlagenhauff |
| 2,996,074 | A | * | 8/1961 | Page et al. ............... 137/220 |
| 3,007,672 | A | | 11/1961 | Tischler |
| 3,023,770 | A | | 3/1962 | Godshalk |
| 3,253,608 | A | * | 5/1966 | Davis ....................... 137/220 |
| 3,321,177 | A | | 5/1967 | Fendel et al. |
| 3,502,105 | A | | 3/1970 | Ernyei |
| 3,534,763 | A | | 11/1970 | Lucardie |
| 3,809,362 | A | | 5/1974 | Baumann |
| 3,977,382 | A | | 8/1976 | Tuzson et al. |
| 4,190,231 | A | | 2/1980 | Vimercati |
| 4,216,795 | A | | 8/1980 | Cobb et al. |
| 4,360,370 | A | | 11/1982 | McAndrew |

(Continued)

FOREIGN PATENT DOCUMENTS

EP          566543 A1 * 10/1993  ................ 137/219

*Primary Examiner* — John Rivell
(74) *Attorney, Agent, or Firm* — Carlson, Gaskey & Olds

(57) ABSTRACT

A metering valve includes a valve body, a flow tube, an orifice plate, a central flow body, and a mover. The valve body has an inlet and an outlet. The flow tube is carried for axial movement in slidable and sealing engagement with the valve body at an inlet end and an outlet end. The orifice plate has an outlet. The central flow body is provided on an upstream end of the orifice plate and has an annular seal configured to seat into engagement with the outlet end of the flow tube when the flow tube is moved to a downstream position. The central flow body also includes a central, protruding flow diverter upstream and central of the annular seal. The mover is provided in the valve body and is configured to carry the flow tube for displacement of the output end toward and away from the central flow body.

17 Claims, 11 Drawing Sheets

(56) References Cited

U.S. PATENT DOCUMENTS

| | | | |
|---|---|---|---|
| 4,362,185 A | 12/1982 | Kadner | |
| 4,373,699 A | 2/1983 | Leiberich | |
| 4,474,356 A | 10/1984 | Baumann | |
| 4,506,860 A | 3/1985 | vonSchwerdtner | |
| 4,522,223 A | 6/1985 | Balsys et al. | |
| 4,607,822 A | 8/1986 | Schabert et al. | |
| 4,646,786 A | 3/1987 | Herder et al. | |
| 4,679,765 A | 7/1987 | Kramer et al. | |
| 4,728,075 A | 3/1988 | Paradis | |
| 4,796,651 A | 1/1989 | Ginn et al. | |
| 4,842,246 A | 6/1989 | Floren et al. | |
| 4,850,392 A | 7/1989 | Crump et al. | |
| 4,976,404 A | 12/1990 | Ichikawa et al. | |
| 5,011,113 A * | 4/1991 | Stobbs et al. | 251/129.21 |
| 5,123,436 A | 6/1992 | Koechlein et al. | |
| 5,146,941 A | 9/1992 | Statler | |
| 5,211,198 A | 5/1993 | Tinholt | |
| 5,232,195 A | 8/1993 | Torrielli | |
| 5,251,148 A * | 10/1993 | Haines et al. | 137/487.5 |
| 5,259,590 A | 11/1993 | Chambers | |
| 5,309,934 A | 5/1994 | Jaeger | |
| 5,318,270 A | 6/1994 | Detanne et al. | |
| 5,351,934 A | 10/1994 | Jensen et al. | |
| 5,388,607 A * | 2/1995 | Ramaker et al. | 137/487.5 |
| 5,435,337 A * | 7/1995 | Kemp | 137/220 |
| 5,503,363 A | 4/1996 | Wallace | |
| 5,529,281 A | 6/1996 | Brudnicki et al. | |
| 5,544,856 A | 8/1996 | King et al. | |
| 5,618,022 A | 4/1997 | Wallace | |
| 5,641,148 A | 6/1997 | Pena et al. | |
| 5,772,182 A | 6/1998 | Stambaugh, Sr. et al. | |
| 5,787,915 A | 8/1998 | Byers et al. | |
| 5,826,613 A | 10/1998 | Schalk | |
| 5,878,992 A | 3/1999 | Edwards et al. | |
| 5,904,335 A | 5/1999 | Oyama | |
| 5,915,669 A | 6/1999 | Zabeck et al. | |
| 6,129,333 A | 10/2000 | Ma | |
| 6,296,009 B1 | 10/2001 | Hartman et al. | |
| 6,392,322 B1 | 5/2002 | Mares et al. | |
| 6,427,970 B1 | 8/2002 | Silva | |
| 6,882,924 B2 * | 4/2005 | Miller | 701/100 |
| 7,069,137 B2 * | 6/2006 | Miller | 701/100 |
| 8,141,435 B2 * | 3/2012 | Krishnan et al. | 73/861.42 |
| 2004/0216782 A1 | 11/2004 | Mares et al. | |

* cited by examiner

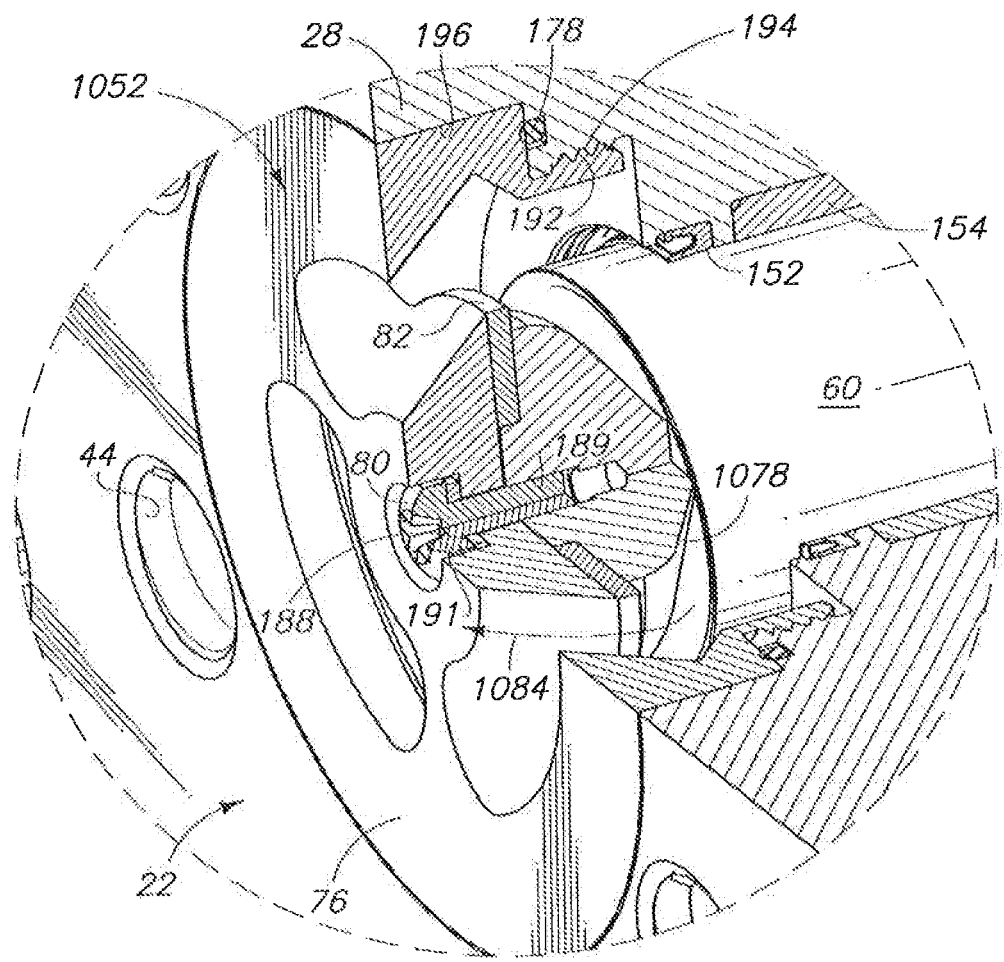

GAS TURBINE METERING VALVE

RELATED APPLICATION

This application is a continuation of U.S. application Ser. No. 10/429,092, filed on May 3, 2003 now abandoned.

TECHNICAL FIELD

The present disclosure pertains to fuel delivery valves. More particularly, the present disclosure relates to fuel metering valves that regulate delivery of fuel to a turbine engine.

BACKGROUND OF THE INVENTION

Liquid and gas fuel metering valves have been used for a number of industrial turbine engine applications. For example, liquid fuel metering valves have been used in numerous marine applications.

In another case, gas fuel metering valves have been coupled with industrial turbine engines. For example, VG Series gas fuel metering valves such as the VG1.5, sold by Precision Engine Controls Corporation of San Diego, Calif., assignee of the present invention, have a balanced design with a single moving part. However, the gas flow path that extends through such valves deviates substantially from a linear flow path, requiring fuel to transit laterally around 90 degree lateral corners which reduces efficiency and performance.

Applications for such fuel metering valves are present in the power industry for generating electrical power with gas turbine engines, for implementation on offshore oil rigs for power generation, on turbine engines in marine applications such as on hovercraft, and in the pipeline industry for related gas turbine engine applications requiring precise fuel metering.

Many fuel metering techniques require the use of a Coriolis flow meter in combination with a metering valve. However, these flow meters are very expensive and cost-prohibitive for many applications and uses.

Accordingly, improvements are needed to increase controllable flow accuracy and efficiency from a fuel metering valve to a gas turbine engine, and to reduce cost of implementation. Additionally, improvements are needed in order to easily reconfigure a fuel metering valve to optimize the accuracy and efficiency of fuel delivery over varying ranges of supply pressure. Even furthermore, improvements are needed in the manner in which a fuel metering valve is controlled in order to deliver a desired flow rate of fuel without requiring the utilization of a separate flow meter which can significantly increase cost and complexity.

SUMMARY OF THE INVENTION

A gas turbine valve is provided having a coaxial valve construction with a displacement sensor for detecting position of a flow tube and an orifice plate assembly that cooperates with the flow tube to tailor flow rate through the valve by adjusting the displacement of the flow tube relative to the flow diverter.

According to one aspect, a metering valve for industrial gas turbine engines includes a valve body, a flow tube, an orifice plate, a central flow body, and a mover. The valve body has an inlet and an outlet. The flow tube is carried for axial movement in slidable and sealing engagement with the valve body at an inlet end. The orifice plate has an outlet end. The central flow body is provided on an upstream end of the orifice plate and has an annular seal configured to seat into engagement with the outlet end of the flow tube when the flow tube is moved to a downstream position. The central flow body also includes a central, protruding flow diverter upstream and central of the annular seal. The mover is provided in the valve body and is configured to carry the flow tube for displacement of the output end toward and away from the central flow body According to another aspect, a gas turbine metering valve includes a valve body, a flow tube, a central flow body, a mover, and a displacement sensor. The valve body has an inlet and an outlet. The flow tube is carried for axial movement in sliding and sealing engagement at an inlet end with the body inlet and at an outlet end with the body outlet. The central flow body has a circumferential seal configured to seat in engagement with the output end of the flow tube. The mover is provided in the valve body and is configured to carry the flow tube for axial movement to position the output end toward and away from the central flow body to adjust flow capacity through the valve. The displacement sensor is configured to detect axial positioning of the flow tube relative to the central flow body.

BRIEF DESCRIPTION OF THE DRAWINGS

Preferred embodiments of the disclosure are described below with reference to the following accompanying drawings.

FIG. 11 is an alternative construction orifice plate assembly including a different flow diverter than that depicted in FIG. 4, and corresponding with the encircled region 4 of FIG. 4.

DETAILED DESCRIPTION OF THE PREFERRED EMBODIMENTS

Figure 1:
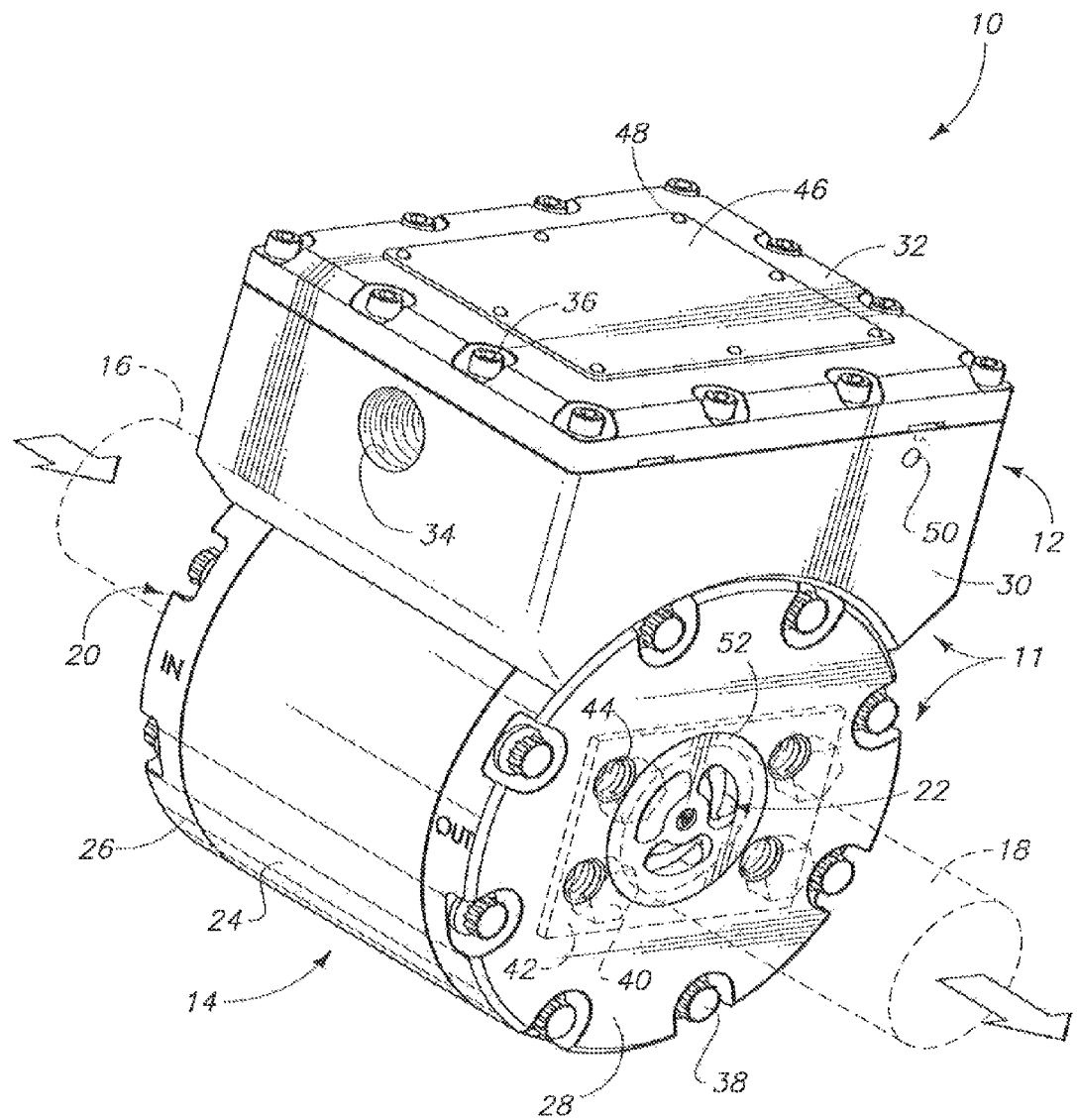
FIG. 1 is an isometric view of a metering valve provided in an application environment for delivering fuel at a controlled rate to a gas turbine engine, according to one aspect of the invention.

This disclosure of the invention is submitted in furtherance of the constitutional purposes of the U.S. Patent Laws "to promote the progress of science and useful arts" (Article 1, Section 8).

Reference will now be made to an exemplary embodiment of Applicants' invention. An exemplary implementation is described below and depicted with reference to the drawings comprising a fuel metering valve for delivering fuel to industrial gas turbine engines. A first embodiment is shown and described below in a configuration with reference generally to FIGS. 1-11. While the invention is described by way of an exemplary embodiment, it is understood that the description is not intended to limit the invention to this embodiment, but is intended to cover alternatives, equivalents, and modifications which may be broader than this embodiment such as are defined within the scope of the appended claims.

In an effort to prevent obscuring the invention at hand, only details germane to implementing the invention will be described in great detail, with presently understood peripheral details being incorporated by reference, as needed, as being presently understood in the art.

A preferred embodiment metering valve in accordance with the invention is described with reference to FIGS. 1-11 and is identified by reference numeral 10. Such a metering valve 10 is particularly suited for use with industrial gas turbine engines. FIG. 11 illustrates a component variation for metering valve 10 that is optimized for different flow rates.

As shown in FIG. 1, metering valve 10 is configured to provide flow control, contamination resistance, and precision control over a wide flow range and within a relatively compact package size. The metering valve is also configured for use with high-performance, low-emissions, industrial gas turbines that require more than just reliable fuel control in order to optimize gas turbine engine functionality. Such applications demand stable, fast, and accurate fuel flow control for a variety of supply pressures and gases.

Figure 3:
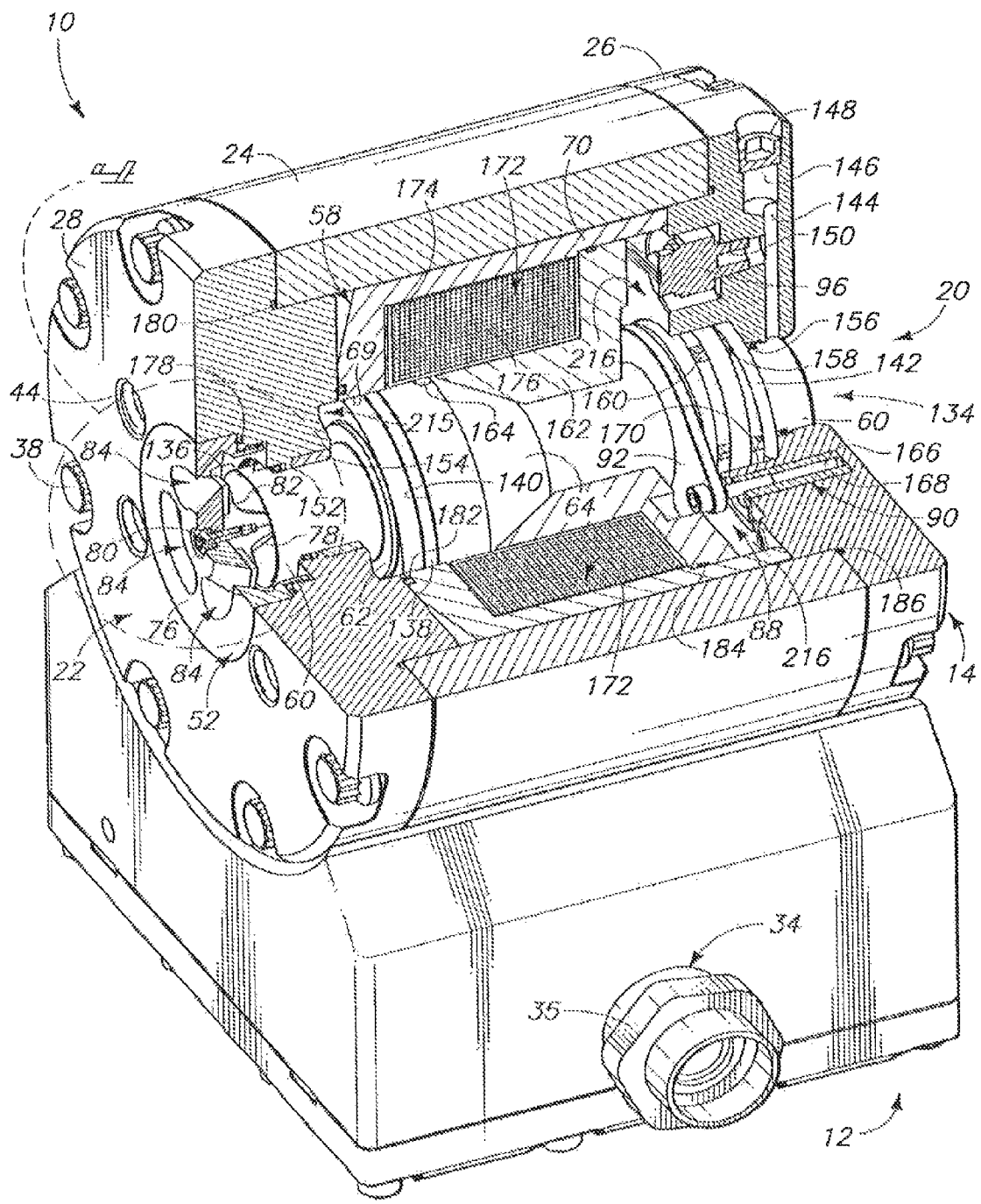
FIG. 3 is a partial breakaway isometric view of the metering valve of FIGS. 1-2 taken along line 3-3 of FIG. 10, with the metering valve positioned upside down and viewed relative to an outlet end.
Figure 5:
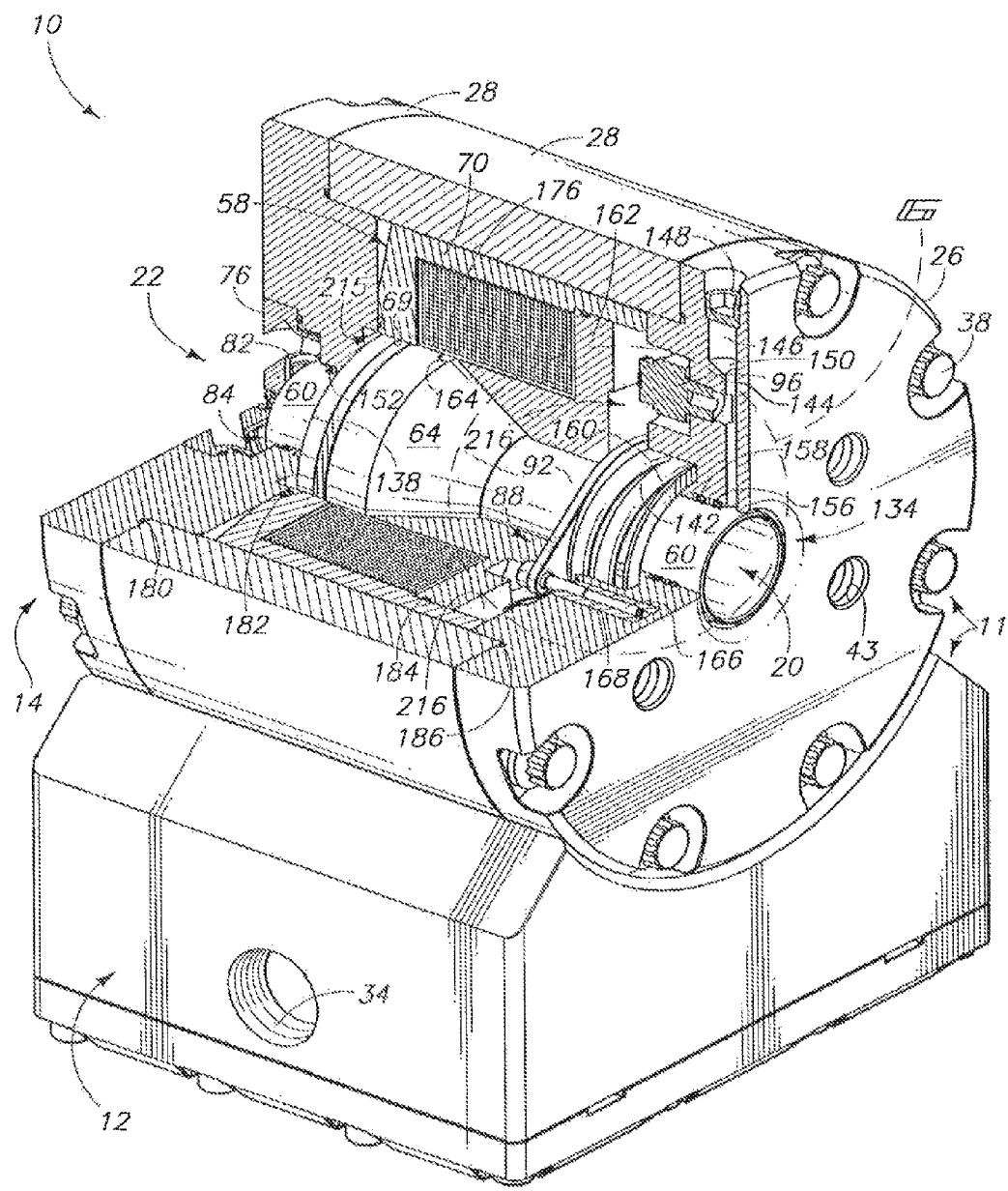
FIG. 5 is a partial breakaway isometric view of the metering valve of FIGS. 1-2 taken along line 5-5 of FIG. 10, with the metering valve positioned upside down and viewed relative to an inlet end.
Figure 7:
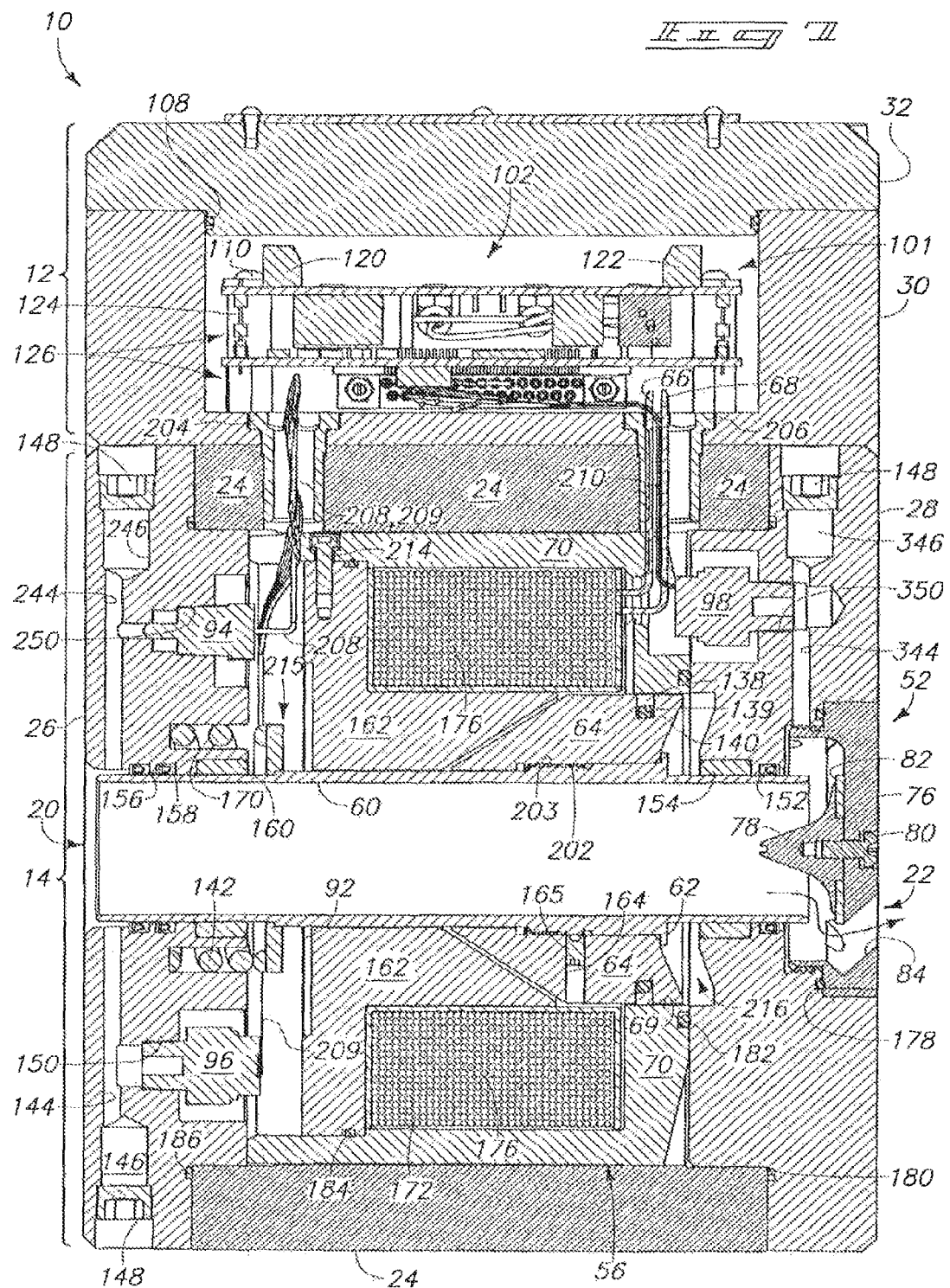
FIG. 7 is a centerline sectional view taken along line 7-7 of FIG. 10 illustrating the internal construction of the metering valve.

In order to achieve this result, metering valve 10 is configured with a valve housing 11 that is formed by an electronics enclosure assembly 12 and a valve body assembly 14 that are secured together by fasteners (see hollow bolt 206 in FIG. 7). According to one construction, housing 11 is formed from 6061-T6 aluminum alloy. Additionally, housing assembly 11 includes various O-ring seals 178, 180, 182, 184 and 186, as shown in FIGS. 3, 5 and 7. Metering valve 10 is mated in sealed engagement with an inlet supply pipe 16 and an outlet supply pipe 18 to deliver fuel from inlet supply pipe 16 in a metered and precisely controlled manner out through outlet supply 18 to a turbine engine (not shown) where it is combusted. Inlet supply pipe 16 is secured with fasteners (not shown) through a mounting end plate at a flow inlet 20, whereas outlet supply pipe 18 is affixed to metering valve 10 via an end plate 42 using similar threaded fasteners, such as individual hex head bolts 40. Outlet supply pipe 18 is secured in sealing engagement with a flow outlet 22 of metering valve 10.

It is understood that inlet supply pipe 16 has an end plate that is similar to end plate 42 of outlet supply pipe 18, and is secured with fasteners similar to threaded bolts 40 which are received within threaded bores 44 of an outlet end plate 28. In the case of flow inlet 20, inlet supply pipe 16 secures with threaded fasteners using a similar end plate within threaded bores 43 (see FIG. 5). It is further understood that each end plate includes a circumferential groove that extends about the respective flow inlet or outlet into which an O-ring is received for sealing and mating engagement between the respective end plate and an orifice plate assembly 52 (in the case of outlet supply pipe 18) and a corresponding circumferential portion of inlet end plate 26 (in the case of inlet supply pipe 16).

Valve body assembly 14 includes a cylindrical valve housing 24 to which inlet end plate 26 and outlet end plate 28 are each affixed at opposite ends using a plurality of threaded, high-strength steel, double hex bolts (or fasteners) 38. Fasteners 38 are preferably equally spaced apart about the circumference of each end plate 26 and 28. A corresponding end portion at each end of valve housing 24 includes complementary, corresponding threaded bores configured to receive fasteners 38. Each end plate 26 and 28 includes a plurality of bores (not shown) that extend completely through the end plate, and are sized to receive each fastener 38 therethrough for threaded engagement within valve housing 24, such as into a respective, threaded aperture 86.

Figure 8:
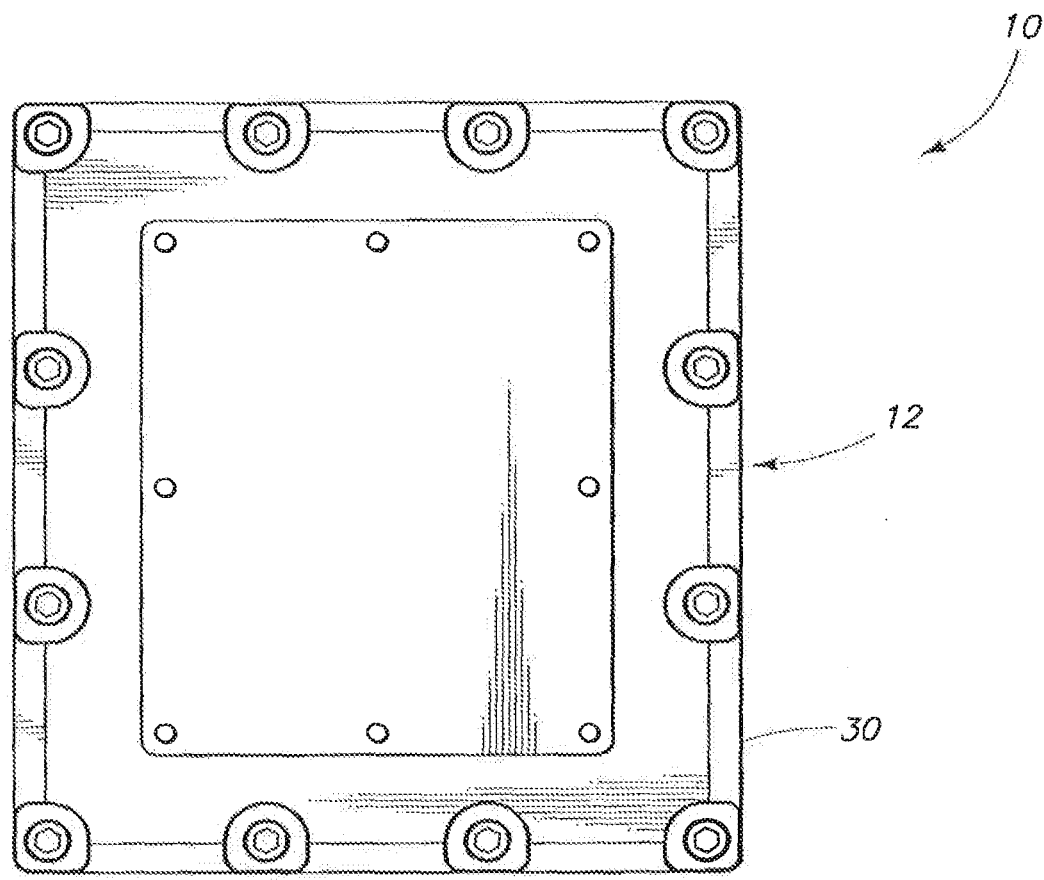
FIG. 8 is a plan view taken from above the metering valve of FIGS. 1-7.
Figure 9:
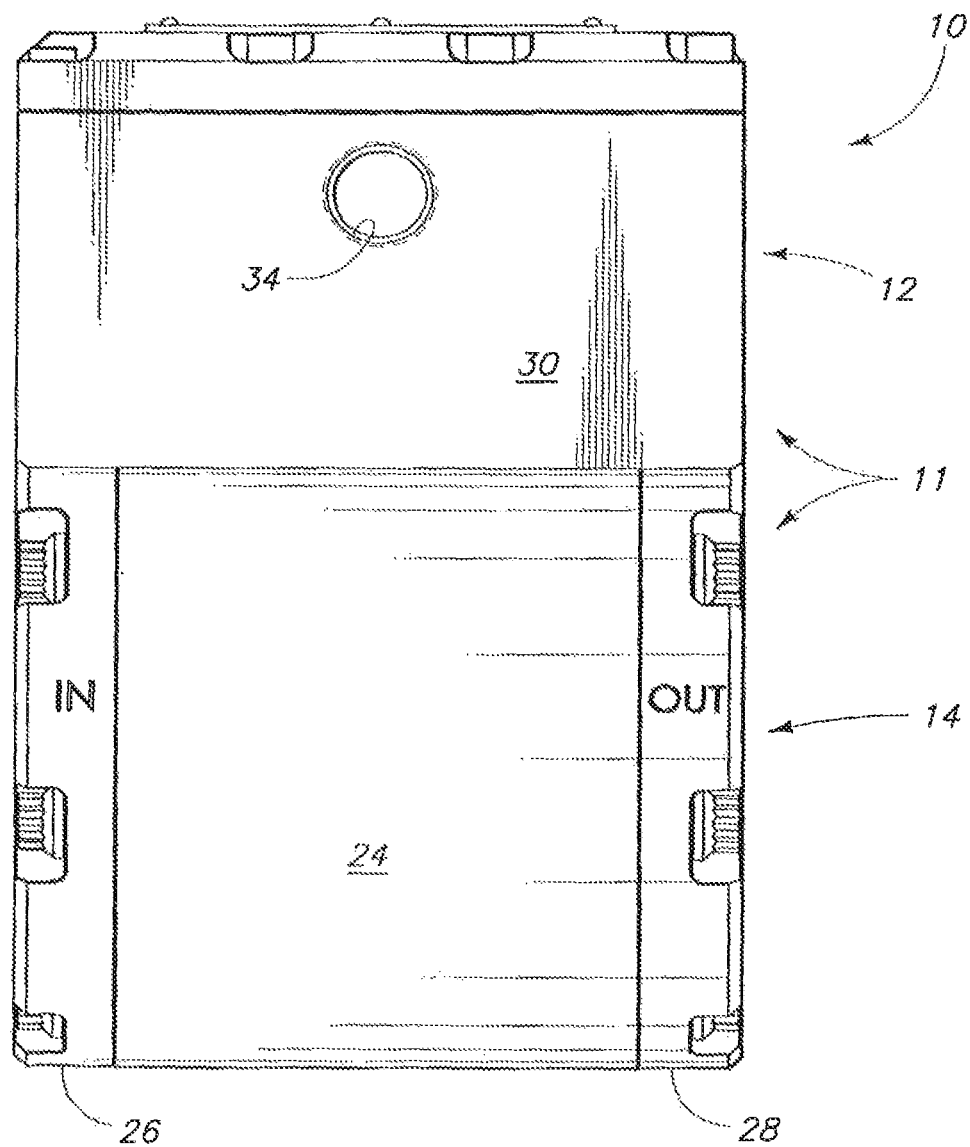
FIG. 9 is a front elevational view taken relative to FIG. 8 further illustrating the metering valve housing assembly.
Figure 10:
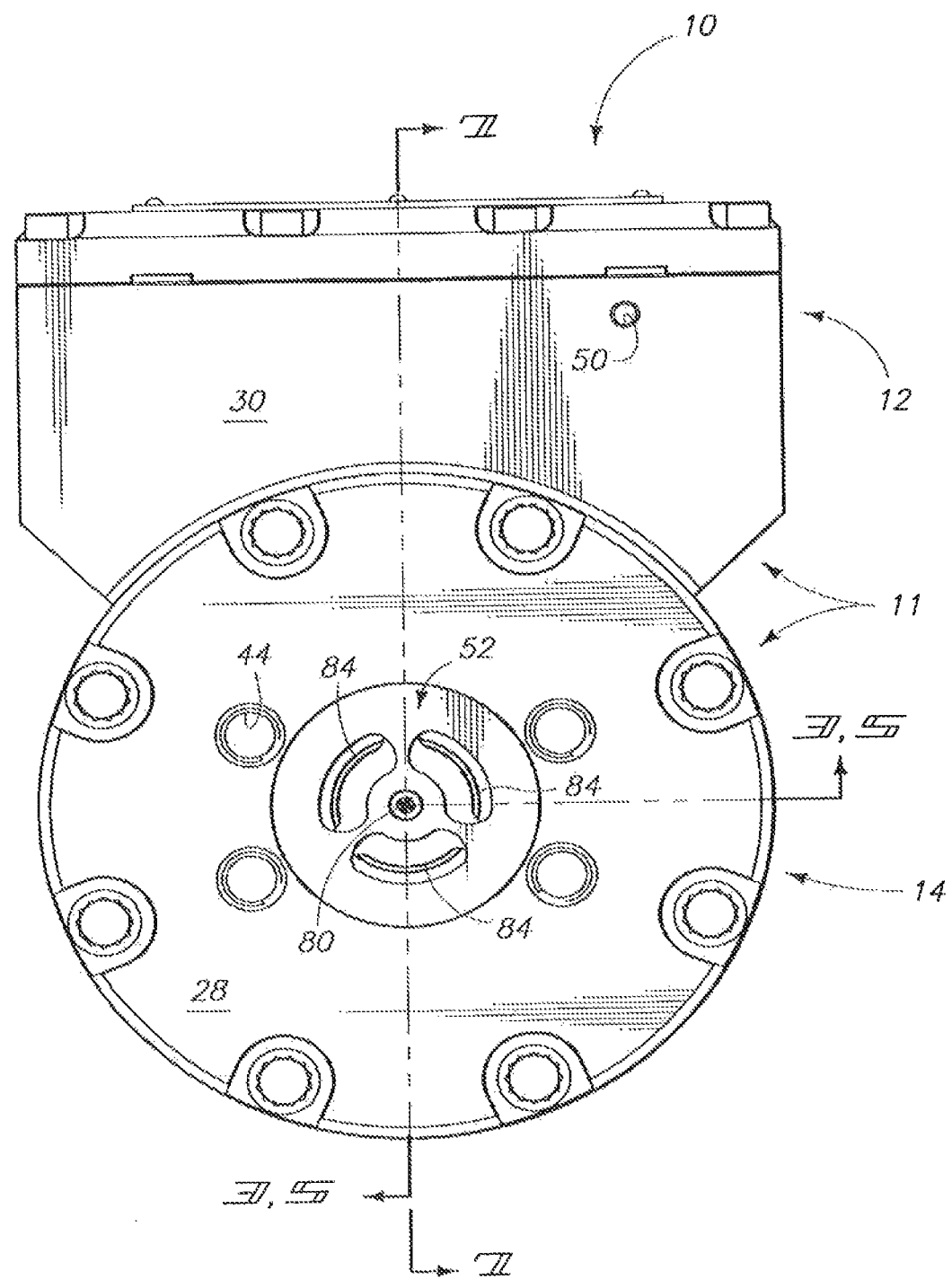
FIG. 10 is a right-side view of the metering valve of FIGS. 8 and 9 illustrating an outlet end of the metering valve and valve housing assembly.

Electronics enclosure assembly 12 includes an electronics housing 30 which is fastened to valve housing 24 using hollow bolts 204 and 206 (as shown in FIG. 7) and a plurality of threaded cap screws (or fasteners) not shown. A cover 32 is affixed atop electronics housing 30 for encasing electronics therein, including electronics that accurately control flow rate through metering valve 10. More particularly, a plurality of threaded cap screws (or fasteners) 36 are used to secure cover 32 atop electronics housing 30. Similarly, each cap screw 36 is passed through a through-bore within cover 32 and into a threaded bore 104 within a topmost edge of electronics housing 30 where such fasteners are threadingly received to retain cover 32 atop electronics housing 30. Further details of enclosure assembly 12 are shown in FIGS. 8-10.

Electronics housing 30 also includes a conduit hole 34 through which a turbine engine explosion-proof conduit is passed therethrough. Conduit hole 34 comprises a ¾" NTP thread. As shown in FIG. 3, an explosion-proof conduit fitting (or union) 35 is threaded into hole 34. More particularly, an explosion-proof wire harness or conduit is passed through conduit hole 34 and fitting 35, after which fitting 35 is potted with a sealing cement and filler so as to make conduit hole 34 explosion proof and sealed as the conduit passes therethrough. One form of sealing cement for use in fitting 35 comprises Kwik Cement, sold by Appleton Electric Company, 1701 West Wellington Avenue, Chicago, Ill. 60657. One form of explosion-proof conduit fitting comprises a UNY or UNF union, also sold by Appleton Electric Company, 1701 West Wellington Avenue, Chicago, Ill. 60657.

Electronics housing 30 of metering valve 10 is constructed as an explosion-proof housing having flame paths. U.S. Pat. No. 6,392,322 to Mares, et al., issued May 21, 2002 and assigned to the present assignee, teaches one suitable technique for providing flame paths in an explosion-proof housing. Such construction techniques are also used herein in order to achieve an explosion-proof electronics housing 30 that is suitable for use in a potentially explosive user environment. Accordingly, U.S. Pat. No. 6,392,322 to Mares, et al. is herein incorporated by reference.

Also shown in FIG. 1, a metal name plate 46 is secured atop cover 32 using a plurality of threaded drive screws 48. Product information for metering valve 10 is then printed on or etched into name plate 46. Furthermore, a threaded ground hole 50 is also provided within a side wall of electronics housing 30 into which a threaded fastener and a ground strap can be attached thereto for grounding the housing of metering valve 10. Preferably, ground hole 50 does not pass completely through the side wall of electronics housing 30.

Figure 2:
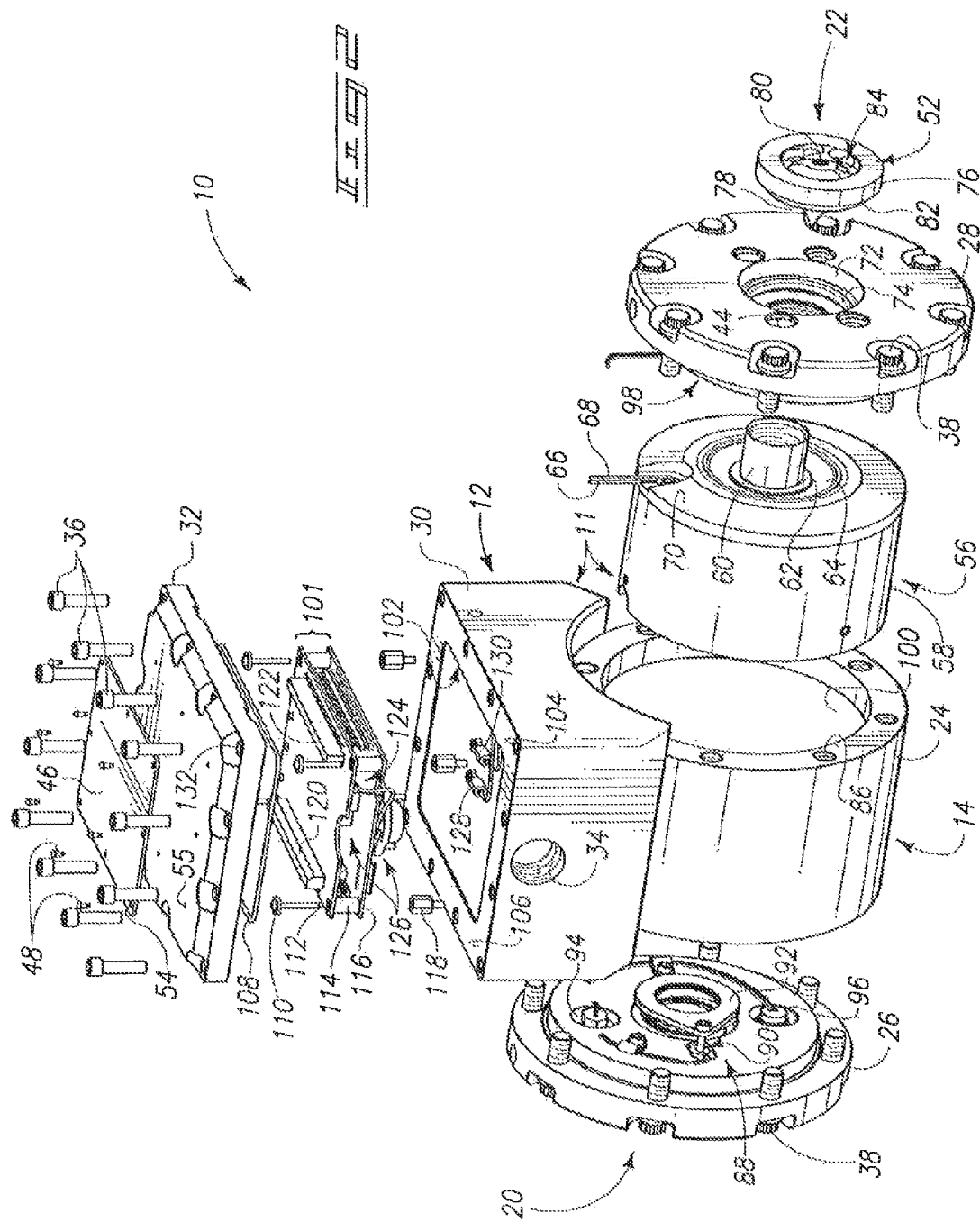
FIG. 2 is an exploded isometric view of the metering valve illustrated in FIG. 1 depicting assembly and placement of internal components.

According to FIG. 2, metering valve 10 is shown in an exploded view to further facilitate understanding of the construction and operation of components contained therein. More particularly, metering valve 10 provides a stable, fast and accurate fuel flow control system extending over a range of supply pressures and gases. Because of the particular design of metering valve 10, a flow-through design is provided that is capable of automatically compensating for variations in pressure and temperature in order to provide precise fuel flow required for specific gas turbine conditions under which the turbine and valve must operate. The electronics assembly includes a determination of fuel flow measurement based on valve feedback derived from pressure, temperature and displacement sensors in the valve. The valve is programmable for flow versus demand and complete closed-loop fuel control is made possible when using particular interface features. Accordingly, metering valve 10 is capable of being programmable for flow versus demand.

Figure 4:
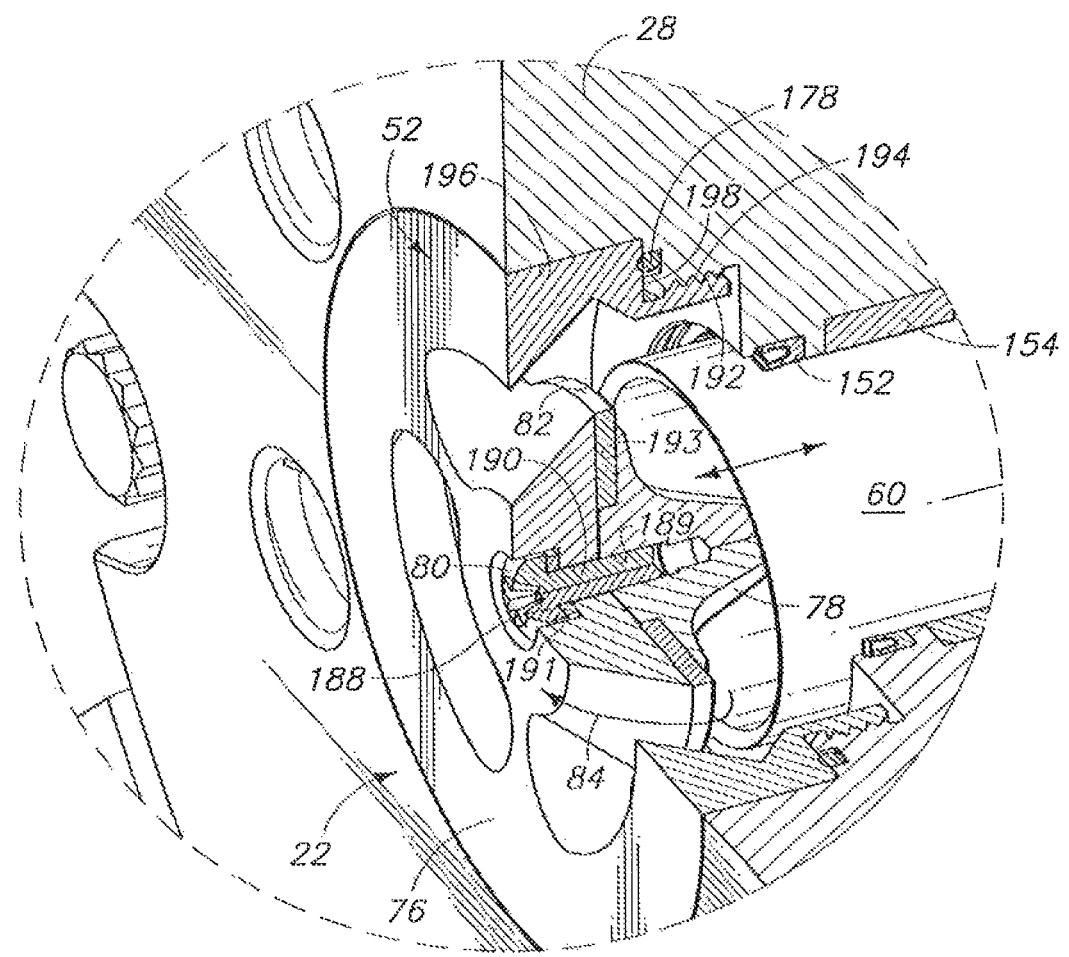
FIG. 4 is an enlarged perspective view from the encircled region 4 of FIG. 3 further illustrating cooperation of the flow tube and orifice plate assembly in metering fuel delivery therethrough.

Metering valve 10 provides a smooth flow-through design by way of an orifice plate assembly 52 that is carried in outlet end plate 28 by way of a female threaded bore 74 (see FIG. 2) including female threaded portion 192 (see FIG. 4). An axial mover 56 comprising a linear motor 58 supports and moves a central cylindrical flow tube 60 toward and away from orifice plate assembly 52 in order to regulate flow through the orifice plate assembly 52. By moving flow tube 60 into engagement with a seal 82 on orifice plate assembly 52, flow is completely stopped at orifice plate assembly 52, and flow outlet 22 is completely closed. By actuating linear motor 58 to move flow tube 60 towards an upstream position away from orifice plate assembly 52, an annular gap 136 (see FIG. 3) is formed between the downstream end of flow tube 60 and seal 82 of orifice plate assembly 52.

In operation, the flow rate of fuel can be controlled by precisely positioning flow tube 60 relative to orifice plate assembly 52. The relative position of the downstream end of flow tube 60 and orifice plate assembly 52 can be varied by accurately positioning flow tube 60 relative thereto. Additionally, flow is tailored based upon the specific axial and radial geometry provided on a flow diverter 78 of orifice plate assembly 52. Flow diverter 78 extends upstream and within flow tube 60 so as to vary the dimension of the annular gap 136 (see FIG. 3) formed therebetween for various positions of the downstream end of flow tube 60 relative to orifice plate assembly 52.

As shown in FIG. 2, orifice plate assembly 52 comprises a cylindrical orifice plate 76 that includes three crescent-shaped flow apertures 84 that are spaced radially about orifice plate 76. According to such construction, orifice plate 76 comprises a spider in which three flow apertures 84 are provided between the spokes of such spider. Orifice plate 76 includes a plurality of male threads adjacent an upstream edge that mate in threading engagement within a threaded bore 74 of outlet end plate 28. A radial outermost portion of orifice plate 76 is received within a complementary bore 72 of outlet end plate 28. According to one construction, orifice plate 76 is made from Nitronic™ 50, a version of 316 stainless steel (SS).

One exemplary feature of the present invention is provided by the ability to replace flow diverter 78 with an alternative flow diverter having a different axial profile (see FIG. 11) by removing threaded fastener 80 which retains flow diverter 78 onto orifice plate 76. Subsequently, a new, alternatively constructed flow diverter can be mounted upstream and onto orifice plate 76 by re-inserting threaded fastener 80 and threading such flow diverter into engagement therewith. Hence, sensitivity of metering valve 10 can be optimized for different ranges of flow rates by substituting in an optional flow diverter having a desired shape.

Linear motor 58 of FIG. 2 includes a motor housing 70 from which a pair of solenoid wires 66 and 68 extends for connection with corresponding electronics within electronics enclosure assembly 12. A circumferential shoulder 62 is rigidly secured to a location on flow tube 60. Shoulder 62 helps retain an armature 64 at a precise location along flow tube 60. Linear motor 58, in assembly, is received within an internal bore 100 of valve housing 24.

In assembly, the double hex bolts 38 extend through outlet end plate 28 and into complementary, corresponding threaded apertures 86 at a downstream end of valve housing 24. Similarly, double hex bolts 38 extend through corresponding apertures in inlet end plate 26 and into threaded apertures in an upstream end of valve housing 24 (similar to threaded apertures 86 provided at a downstream end of valve housing 24, but not shown).

Inlet end plate 26, as shown in FIG. 2, is likewise affixed to an upstream end of valve housing 24 using a plurality of threaded double hex bolts 38. Inlet end plate 26 is configured to support a displacement sensor 88, a temperature inlet sensor 94, and an inlet pressure sensor 96. According to one construction, displacement sensor 88 comprises a linear variable differential transformer (LVDT) 90 that is carried by an LVDT support plate 92. According to one construction, temperature inlet sensor 94 comprises a thermistor. Similarly, an outlet pressure sensor 98 is carried on an inner surface of outlet end plate 28.

According to one suitable construction, LVDT 90 is a model MHR Schaevitz LVDT sensor sold by Measurement Specialties, Inc. (MSI), 710 Route 46 East, Ste. 206, Fairfield, N.J. 07004. Similarly, temperature inlet sensor 94 comprises a Model H-025-08-1 (Part No. 10K3D612) thermistor sold by BetaTHERM of Shrewsbury, Mass., and headquartered in Galway, Ireland. Furthermore, pressure sensors 96 and 98 each comprise a Model 85 Ultra Stable.™. stainless steel pressure sensor manufactured and sold by Measurement Specialties, Inc. (MSI), 710 Route 46 East, Ste. 206, Fairfield, N.J. 07004.

FIG. 2 also illustrates the detailed construction and assembly of electronics enclosure assembly 12 which is secured atop valve body assembly 14 to form a valve housing assembly 11. As shown in FIGS. 2, and 7, electronics housing 30 is configured to form a substantially rectangular electronics cavity 102 within assembly 12. An electronics package 101 is physically attached to a bottom surface of electronics cavity 102 using four threaded fasteners 110 that are threaded into engagement with female threads provided within corresponding standoffs 118 that are threaded into the bottom surface of electronics cavity 102.

More particularly, electronics package 101 includes a motor driver printed circuit (PC) board 112 and a digital logic printed circuit (PC) board 116. Boards 112 and 116 are carried in spaced-apart relation using a plurality of tubular spacers 114 that are placed in coincidence within apertures at each of the four corners of each board 112 and 116 and configured to receive threaded fasteners 110 therethrough and into standoffs 118. Standoffs 118 are first secured within threaded female apertures within a bottom surface of electronics cavity 102. Standoffs 118 further include female threads sized to receive fasteners 110 at a topmost end for securing electronics package 101 within electronics cavity 102. Board 112 includes a pair of customer connectors 120 and 122 which will be discussed in greater detail below. Electronics 124 are provided on board 112. Processing circuitry 126 is provided on both boards 112 and 116. Additionally, a pair of powered diode wires 128 and 130 are provided.

Upon mounting electronics package 101 within electronics cavity 102, cover 32 is then secured atop housing 30 using a plurality of threaded cap screws 36 which are received through respective clearance through-bores 132 and cover 32. To facilitate sealing engagement of cover 32 to housing 30, an O-ring seal 108 is provided within a complementary receiving groove on the bottom of cover 32 positioned to mate with a top sealing surface 106 provided on housing 30 inboard of threaded bores 104 that receive threaded portions of cap screws 36, in assembly.

To complete assembly, product name plate 46, including product and manufacturing information printed or embossed thereon, is affixed atop cover 32 using a plurality of drive screws 48 that pass through holes 54 in plate 46 for threaded securement within corresponding threaded holes 55 provided in corresponding locations of cover 32.

Upon assembly, metering valve 10 of FIG. 2 is configured to receive fuel into flow inlet 20, meter such fuel by axially positioning flow tube 60 relative to seal 82 and flow diverter 78 of orifice plate assembly 52, and deliver fuel at a desired rate to a gas turbine engine via three flow apertures 84 that provide flow outlet 22. The fuel can be gas or liquid. Optimally, the metering valve can be used to deliver a mixture of fuel and air.

According to FIG. 3, a flow tube assembly 134 within metering valve 10 provides for precision fuel flow control over a wide flow range and within a very compact package size through axial displacement of flow tube 60 relative to seal 82 and flow diverter 78 of orifice plate assembly 52. By properly energizing wire windings 176 of motor winding assembly 172, electromagnetic force (EMF) lines of flux attract an armature 64 of flow tube assembly 134 towards a pole piece 162. By adjusting the duty cycle to wire windings 176, the position of armature 64 (as well as tube 60) can be varied such that a frustoconical portion of armature 64 is moved closer towards pole piece 162, thereby compressing coil spring 142. When windings 176 are not energized, coil spring 142 drives flow tube 60 into sealing engagement with seal 82 of orifice plate assembly 52, thereby completely shutting off flow through metering valve 10.

As shown in FIG. 3, armature 64 has a frustoconical portion that is shaped in complementary relation with pole piece 162 such that maximum attraction of pole piece 162 brings pole piece 162 into proximate nesting relation with the complementary frustoconical portion of armature 64, thereby moving flow tube 60 away from seal 82 so as to impart a maximum open dimension for flow gap 136. According to one design, flow gap 136 has a maximum valve of one-quarter inch.

According to one construction, motor winding assembly 172 comprises a bobbin case 174 about which a 17-gauge wire is wound so as to provide wire windings 176. Motor winding assembly 172, when energized, generates electromagnetic force (EMF) lines of flux that attract armature 64 and compress spring 142 as wire windings 176 receive an adjusted level of current using a current control loop so as to adjust a duty cycle therethrough. The presence of wire windings 176 between motor housing 70 and pole piece 162 cooperates with armature 64 so as to provide appropriate lines of flux to attract the armature 64 to pole piece 162.

In order to determine the relative position of flow tube 60 and the width of circumferential flow gap 136, a displacement sensor 88 in the form of LVDT 90 detects the position of flow tube 60 relative to inlet end plate 26 in valve housing 24. Such relative displacement corresponds with the displacement of flow tube 60 relative to orifice plate 76 which corresponds with the dimension of flow gap 136. Accordingly, fuel is precisely delivered at a desired flow rate by way of flow inlet 20 to flow tube 60 and out through three flow apertures 84 that are provided through orifice plate 76, as flow tube 60 is spaced away a desired distance from seal 82 via actuation of linear motor 58 corresponding with a specific duty cycle being delivered to wire windings 176.

As shown in FIGS. 3 and 5, LVDT 90 comprises a mechanically actuated core 166 that is carried by support plate 92 in fixed relation with flow tube 60. Accordingly, movement of flow tube 60 can be detected by movement of plate 92 and core 166 relative to coils within a cylindrical coil assembly (or transformer) 168. Movement of the mechanically actuated core 166 relative to assembly 168 changes reluctance of a flux path between a primary coil and a secondary coil of assembly 168, thereby generating an output signal related to displacement of flow tube 60. It is further understood that circuitry is provided for interfacing with LVDT sensor 90 within circuitry provided in electronics package 101 (of FIG. 2).

As shown in FIGS. 3 and 5, in operation, displacement sensor 88 is configured to detect axial positioning of flow tube 60 relative to a central flow body provided by flow diverter 78 and seal 82 of orifice plate assembly 52. Fuel which is received upstream via flow inlet 20 passes downstream through flow tube 60, out and around circumferential flow gap 136, and out through three arcuate, circumferentially spaced-apart flow apertures 84 within orifice plate 76. Fuel leaving through flow apertures 84 thereby provide for flow outlet 22. Subsequently, the precisely metered fuel is delivered to an outlet supply pipe, such as outlet supply pipe 18 depicted in FIG. 1.

According to FIGS. 3 and 4, flow diverter 78 is shaped the shape can determine the outlet characteristics, such as flow resolution, provided between flow tube 60, flow diverter 78, and seal 82 as fuel is delivered through flow apertures 84 into flow outlet 22. As shown in FIG. 4, a threaded fastener 80, along with a lock washer 188, is received within an enlarged, recessed bore 191, a clearance bore 190, and into a threaded bore 189 that is provided within flow diverter 78. Securement of threaded fastener 80 into threaded bore 189 retains flow diverter 78 onto orifice plate 76. An elevated shoulder 193 is provided in flow diverter 78 and sized sufficiently to securely retain seal 82 in sealing engagement between flow diverter 78 and orifice plate 76 as fastener 80 is secured into flow diverter 78. Such construction enables a user to easily clean the valve and to change the shape of flow diverter 78. For example, alternatively-shaped flow diverter 1078 (see FIG. 11) can be substituted for flow diverter 78.

As shown in FIGS. 3 and 5, flow tube 60 is carried for axial movement by linear motor 58 in slidable and sealing engagement at the input end and the output end with inlet end plate 26 and outlet end plate 28 of valve body assembly 14, respectively. More particularly, a dynamic seal 152 is provided adjacent the downstream end of flow tube 60, as shown in FIGS. 3 and 4. According to one construction, dynamic seal 152 is formed from a filled polytetrafluoroethylene (PTFE). Adjacent an upstream seal 152, a circumferential bearing 154 is provided. According to one construction, bearing 154 comprises a Rulon™ J bearing. Bearing 154 facilitates axial fore and aft movement of flow tube 60 relative to outlet end plate 28; whereas seal 152 provides a sliding seal along the downstream end of flow tube 60 relative to outlet end plate 28.

Figure 6:
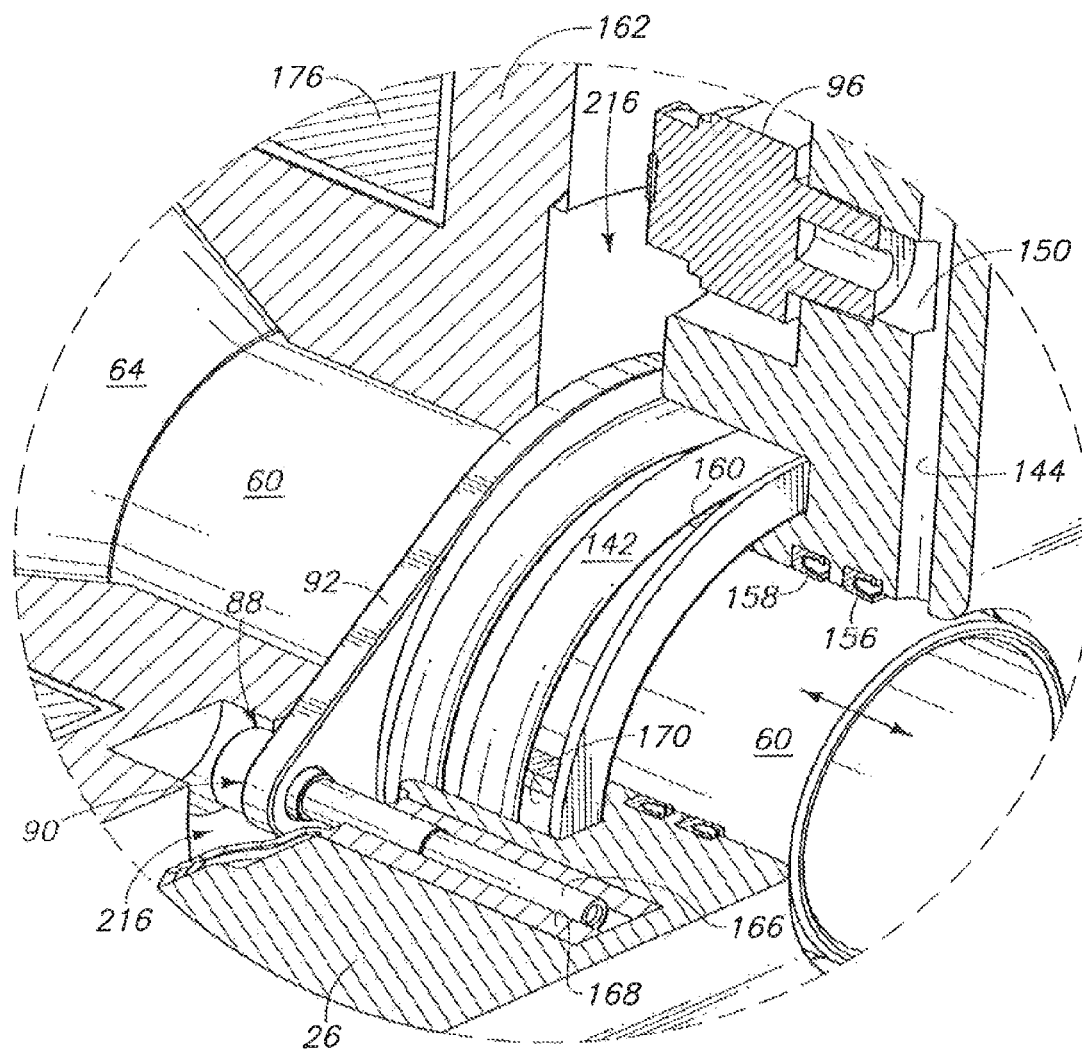
FIG. 6 is an enlarged perspective view from the encircled region 6 of FIG. 5 depicting the displacement sensor and the spring for axially biasing the flow tube within the metering valve of FIGS. 1-5.

Similarly, FIGS. 5 and 6 further illustrate the seal and support components provided for flow tube 60 relative to inlet end plate 26. More particularly, a wiper seal 156 is provided adjacent an upstream end of flow tube 60 so as to provide a wiping seal between flow tube 60 and inlet end plate 26.

Additionally, a dynamic seal 158 is provided downstream of wiper seal 156 to further facilitate a dynamic seal between flow tube 60 and inlet end plate 26. Furthermore, a circumferential bearing 160 is provided downstream of dynamic seal 158, between flow tube 60 and inlet end plate 26. Bearing 160 provides a sliding bearing surface to facilitate axial fore and aft motion of flow tube 60 relative to inlet end plate 26. According to one construction, dynamic seal 158 comprises a filled polytetrafluoroethylene (PTFE). According to one such construction, bearing 160 also comprises a Rulon.™. J bearing.

FIG. 4 illustrates in greater detail the removable and sealing mounting features of orifice plate assembly 52 in outlet end plate 28. More particularly, orifice plate 76 has a circumferential outer diameter that is received in a complementary cylindrical bore 196 within outlet end plate 28. Orifice plate 76 includes a stepped-down diameter portion comprising a male threaded shoulder 194. Threaded shoulder 194 is threaded into engagement within complementary, corresponding female threaded bore 192 within outlet end plate 28. A perpendicular circumferential face 198 is provided between cylindrical bore 196 and threaded bore 192. A groove in face 198 is configured to receive a cylindrical O-ring 178 that provides a seal between orifice plate 76 and outlet end plate 28.

The ability to mate and demate orifice plate assembly 52 with outlet end plate 28 facilitates inspection, cleaning, and maintenance of respective components including seal 152, flow diverter 78, and seal 82. Additionally, one feature of the present invention entails changing the geometric configuration of flow diverter 78 by replacing flow diverter 78 with an alternatively constructed and configured flow diverter, such as flow diverter 1078 as shown with reference to FIG. 11 and described in greater detail below.

As shown in FIGS. 3, 5 and 6, coil spring 142 is received within a cylindrical groove 170. As shown in FIG. 6, once flow tube 60 is moved to a maximum open-valve position for the metering valve, support plate 92 compresses spring 142 within cylindrical groove 170 to a maximum compressive position. Corresponding with such position, displacement sensor 88, here LVDT 90, detects such maximum open position by way of core 166 being displaced maximally within cylindrical coil assembly (or transformer) 168. When the flow tube is moved to a closed position for the valve assembly, plate 92 moves in a downstream direction as the motor is de-energized, thereby enabling coil spring 142 to drive flow tube 60 to a downstream position as plate 92 (which is circumferentially affixed to flow tube 60) pushes flow tube 60 into sealing and seating engagement with seal 82 (see FIG. 4) at an opposite end. Hence, coil spring 142 ensures closure of the valve assembly when the linear motor is not energized. Hence, further benefit is provided in that the valve is closed when power is lost to the drive motor.

As shown in FIGS. 3, 5 and 7, armature 64 has a cylindrical outermost portion that is contiguous with a frustoconical portion. However, a downstream end of armature 64 is undercut, as shown in FIGS. 3 and 7. Armature 64, as shown in FIG. 7, has female threads 202 that enable threaded engagement of armature 64 onto flow tube 60 via complementary, corresponding male threads 203 that are provided on flow tube 60. A circumferential shoulder 62 on flow tube 60 provides an affixation stop point for securing armature 64 in threaded engagement at a fixed location along flow tube 60, as shown in FIG. 7.

Additionally, a circumferential groove 140 is provided on the radial outermost portion of armature 64 (see FIG. 7) into which an O-ring 139 is first provided and on top of which a seal ring 138 is further provided. As shown in FIGS. 3, 5 and 7, seal ring 138 forms a sliding piston-type seal with a bore 69 provided in motor housing 70. Armature 64 is further secured, after threading, onto flow tube 60 at a fixed position using threaded set screw 165 that is received within a threaded set screw hole 164 of armature 64. Set screw 165 is threaded into screw hole 164 until set screw 165 engages with an outer surface of flow tube 60, thereby fixing armature 64 at a desired location on flow tube 60.

The provision of seal ring 138 along cylindrical bore 69 provides a further advantage to the present metering valve. According to one construction, seal ring 138 is made of steel. More particularly, seal ring 138 provides dampening of flow tube 60 as seal ring 138 and bore 69 cooperate to partition a pair of sealed air chambers 215 and 216 (see FIGS. 3, 5 and 7) downstream and upstream of seal ring 138, respectively. As shown in FIG. 7, movement of armature 64 and seal ring 138 within cylindrical bore 69 provides compression and evacuation on respective opposite sides of seal ring 138 as armature 64 moves so as to change the relative volumes of air chambers 215 and 216. Such action imparts dampening to sudden motions of flow tube 60 within the metering valve which imparts benefits and stability to fuel flow control by the valve.

FIGS. 2 and 7 illustrate the provision of a temperature sensor in the form of a thermistor 94 which is provided adjacent an inlet (or upstream) end of flow tube 60 for measuring inlet temperature of fuel into flow tube 60 of metering valve 10. As shown in FIGS. 2 and 7, thermistor 94 is threaded for mounting into a threaded bore 250 provided in inlet end plate 26. As shown in FIG. 7, threaded bore 250 is in fluid communication with a temperature port 244 that communicates with an upstream end of flow tube 60 for detecting upstream temperature at flow tube 60. To facilitate manufacturing of temperature port 244, an enlarged port 246 is provided with a threaded female portion for receiving a threaded plug 148. Plug 148 is used to seal the radial outer end of threaded port 246 and to further facilitate cleaning and maintenance of port 244. Further close-up details of the position of inlet pressure sensor 96 relative to pressure port 144 are illustrated in FIG. 6.

In addition to illustrating the position of thermistor 94 and temperature port 244, FIGS. 2-3 and 5-7 further illustrate the positioning of an inlet pressure sensor 96 (see FIGS. 2-3 and 5-7) and an outlet pressure sensor 98 (see FIGS. 2 and 7). The resulting detected temperature from thermistor 94 and pressures from pressure sensors 96 and 98 are utilized to calculate fuel flow delivery rates through metering valve 10 for both sub-sonic and sonic flow conditions. Alternatively, a flow meter can be used to correlate flow rate with positioning of flow tube 60.

Inlet pressure sensor 96 is received within a threaded bore 150 which communicates via the pressure port 144 with flow inlet 20. Pressure port 144 is formed similar to temperature port 244 wherein an enlarged threaded port 146 is first formed and in which a threaded plug 148 is provided to seal threaded port 146 and pressure port 144 after construction.

Similarly, outlet pressure sensor 98 is threaded into a similar threaded bore 350 which communicates with a pressure port 344. An enlarged threaded port 346 is used to facilitate construction of pressure port 344, after which another threaded plug 148 is threaded into sealing engagement therein.

In operation, temperature port 244 enables thermistor 94 to detect inlet temperature of fuel at flow inlet 20. Likewise, pressure port 144 enables inlet pressure sensor 96 to detect pressure of fuel at flow inlet 20. Finally, pressure port 344 enables outlet pressure sensor 98 to detect downstream pressure adjacent flow outlet 22, or adjacent to the downstream end of flow tube 60.

FIG. 7 illustrates the physical attachment of electronics enclosure assembly 12 to valve body assembly 14. More particularly, a pair of hollow bolts 204 and 206 are used to secure electronics enclosure assembly 12 to valve body assembly 14. Additionally, hollow bolts 204 and 206 facilitate the passage of wiring from sensors 94, 96 and 98 to electronics package 101 within electronics enclosure assembly 12. More particularly, wires 208 and 209 pass through hollow bolt 204; whereas wires 210 and solenoid wires 66 and 68 pass through hollow bolt 206. Each bolt 204 and 206 includes a circumferential outer groove 213 in which a helicoil lock 212 is provided to lock each bolt 204 and 206 into the respective threaded surfaces provided in valve housing 24.

Also shown in FIG. 7, a threaded fastener 214 is used to secure motor housing 70 together with pole piece 162. Two other threaded fasteners 214 are equally spaced circumferentially from threaded fastener shown in FIG. 7.

FIGS. 8-10 illustrate the general layout of valve housing assembly 11 for metering valve 10. As shown in FIG. 8, one exemplary construction for metering valve 10 is 6.75 inches deep, which corresponds with the vertical length of cover 30 as shown in FIG. 8. Also according to such exemplary construction, such valve has a width of 5.8 inches, which corresponds with the distance from the outer surfaces of inlet end plate 26 and outlet end plate 28. Furthermore, such exemplary valve has a height, as shown in FIGS. 9 and 10, of 9.1 inches. However, it is understood that other constructions and dimensions are possible according to various aspects of the invention.

FIG. 11 illustrates an alternative configuration orifice plate assembly 1052, similar to orifice plate 52 in FIG. 4, but having an alternatively-shaped flow diverter 1078. More particularly, orifice plate 76 carries, by way of threaded fastener 80, flow diverter 1078 on an upstream side of orifice plate 76. As was the case with flow diverter 78 in FIG. 4, flow diverter 1078 traps seal 82 in sealing engagement circumferentially thereabout against orifice plate 76. Fastener 80 is removably received in secure engagement within complementary threads in flow diverter 1078 and is further locked therein using a lock washer 188. Fastener 80 mates with female threads in threaded bore 189 provided in flow diverter 1078. Additionally, an enlarged clearance bore 191 is recessed into orifice plate 76 to receive the head in flush relation therein. The provision of flow diverter 1078 provides a modified flow aperture 1084 through orifice plate assembly 1052.

Comparing flow diverter 78 of FIG. 4 with flow diverter 1078 of FIG. 11, both flow diverters provide a Rankine half-body of revolution. Flow diverter 78 is configured in the shape of a witch's hat, having a concave, conical shape. Flow diverter 1078 has a somewhat hemispherical-shaped head that is generally convex in shape.

Flow diverter 78 of FIG. 4 has been found to be optimally suited for incorporation into the present metering valve when the metering valve is used as a main fuel control valve for a gas turbine engine. In contrast, flow diverter 1078 has been found to be ideally suited for incorporation into the metering valve when the metering valve is used as a pilot fuel control valve for a gas turbine engine. In summary, the ability to vary the configuration of a flow diverter enables reconfiguration of a metering valve to obtain better flow resolution, or area resolution, for particular applications.

By way of example, flow diverter 1078 of FIG. 11 is more optimal for smaller flows of fuel; whereas flow diverter 78 of FIG. 4 is better for higher flow rates of fuel.

As shown in FIGS. 1-11, metering valve 10 uses onboard sensors and digital electronics to automatically measure and control mass flow of fuel over a wide range of temperatures and pressures. The actual fuel flow can be determined with onboard electronics based on feedback signals from sensors in the valve. The metering valve also uses integrated, 24-volt DC (VDC) digital electronics that contain additional inputs and outputs for allowing programmable flow control, closed-loop turbine control, and an array of other options. Analog interfaces are provided within the electronics housing which are user configurable as 4-20 mA (current) or 0-5 VDC (voltage). Real-time health and data monitoring of the metering valve can also be implemented through an isolated RS232/485 serial interface that enables a user to see mass flow, inlet and outlet pressures, gas temperature and diagnostics for the metering valve.

The flow tube construction for the metering valve is balanced. Additionally, the flow-through construction is self-cleaning. Even furthermore, the only moving part present within the valve is the moving core that is driven by a direct acting solenoid comprising the armature and flow tube. As a result, prior art techniques of utilizing pneumatics or hydraulics for actuating a valve are eliminated, and their concomitant tendency to leak and break down is eliminated from the design. A fail-safe closing spring having an easy-to-clean soft seat provides a positive, leak-tight shutoff which further enhances the contamination-resistant design of the metering valve.

Under experimental tests, it has been determined that the present metering valve design results in improved flow performance because of its smooth, flow-through design. The metering valve has been found to have a 200:1 turn-down ratio and a plus or minus one percent linearity, making such metering valve ideal for use with 1-10 megawatt gas turbines. Even furthermore, the electronics on the metering valve enable a user to program a maximum flow rate and relatively easily achieve such result by way of the incorporated sensors.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A gas metering valve, comprising:
    an electronics enclosure assembly having a cover affixed atop an electronics housing to house electronics;
    a valve body having an inlet, an outlet, and an explosion-proof housing, wherein said electronics housing at least partially surrounds said explosion-proof housing;
    an axial flow tube carried for axial movement in sliding and sealing engagement at an inlet end with the valve body inlet and at an outlet end with the valve body outlet,
    a central flow body having a circumferential seal configured to seat in engagement with the outlet end of the axial flow tube;
    a proportional electromechanical mover provided in the valve body, control electronics for the mover isolated from the valve body by the explosion-proof housing, and configured to carry the axial flow tube for proportional axial movement to position the outlet end toward and away from the central flow body to adjust flow capacity through the valve body;

an axial displacement sensor configured to detect axial positioning of the axial flow tube relative to the central flow body;

a temperature sensor configured to detect a temperature of a fluid communicated through the valve body;

a pressure sensor configured to detect a pressure of the fluid; and at least one of the axial displacement sensor, the temperature sensor and the pressure sensor are supported by an inlet end plate of the valve body.

2. The valve of claim 1 wherein the central flow body comprises an orifice plate, the flow tube is a cylindrical tube, and the flow body extends in an upstream direction from the orifice plate in axial alignment with the flow tube to mate and demate with the output end of the flow tube as the flow tube is moved in upstream and downstream directions, respectively.

3. The valve of claim 1 wherein the central flow body cooperates with the output end of the flow tube, when in spaced-apart relation, to provide a flow passage therebetween, wherein volumetric flow capacity of the valve is adjusted by moving the flow tube to a desired position relative to the flow body to impart a corresponding volumetric flow capacity therebetween.

4. The valve of claim 1 wherein the displacement sensor comprises a linear variable differential transformer (LVDT).

5. The valve of claim 4 wherein the linear variable differential transformer is affixed at a first end to the valve body and is affixed at a second end to the flow tube.

6. The valve of claim 1 wherein the central flow body is removably secured in the valve body at the body outlet.

7. The valve of claim 1 further comprising a spring interposed between the valve body and the flow tube to bias the flow tube at the downstream end for engagement with the flow body.

8. The valve of claim 7 wherein the mover comprises a linear motor with an armature affixed to the flow tube, a pole piece, and wire windings.

9. The valve of claim 8 wherein the wire windings are energized to generate magnetic forces that attract the armature to move the flow tube upstream and compress the spring.

10. The valve of claim 9 further comprising processing circuitry configured to control energizing of the wire windings to realize a desired upstream positioning of the flow tube relative to the central flow body to achieve a desired flow rate through the valve body.

11. A metering valve comprising:
an electronics enclosure assembly having an electronics housing that includes a cavity that is configured to receive at least one electronics package;
a valve body having an inlet, an outlet, and an explosion-proof housing;
a flow tube carried for axial movement in slideable and sealing engagement with the valve body at an inlet end and an outlet end;
an orifice plate having an outlet;
a central flow body provided on an upstream end of the orifice plate having an annular seal configured to seat into engagement with the outlet end of the flow tube when the flow tube is moved to a downstream position and a central, protruding flow diverter upstream and central of the annular seal comprising a convex, leading end protuberance and a concave lip extending circumferentially about the convex protuberance;
an electromechanical mover electrically connected to the at least one electronics package by at least one solenoid wire and configured to carry the flow tube for displacement of the output end toward and away from the central flow body; and
at least two of an axial displacement sensor, a temperature sensor and a pressure sensor secured to an inlet end plate of the valve body.

12. The valve of claim 11 wherein the flow diverter comprises a central flow diverter with a hemispherical head provided by the convex, leading end protuberance.

13. The valve of claim 12 wherein the orifice plate comprises an outer mounting ring, the flow body, and a spider carrying the flow body coaxially within the mounting ring.

14. The valve of claim 13 wherein the orifice plate further comprises a circumferential array of flow apertures provided between adjacent arms of the spider and about the circumferential seal.

15. The valve of claim 11 wherein the flow diverter comprises a Rankine half-body of revolution.

16. The valve of claim 15 wherein the flow diverter is removably mounted to the upstream end of the orifice plate with a fastener.

17. A gas metering valve, comprising:
electronics enclosure assembly having a cover affixed atop an electronics housing to house electronics;
a valve body having an inlet, an outlet, and an explosion-proof housing, wherein said electronics housing at least partially surrounds said explosion-proof housing;
an axial flow tube carried for axial movement in sliding and sealing engagement at an inlet end with the valve body inlet and at an outlet end with the valve body outlet;
a central flow body having a circumferential seal configured to seat in engagement with outlet end of the axial flow tube;
a proportional electromechanical mover provided in the valve body, control electronics for the mover isolated from the valve body by the explosion-proof housing and configured to carry the axial flow tube for proportional axial movement to position the outlet end toward and away from the central flow body to adjust flow capacity through the valve body;
an axial displacement sensor configured to detect axial positioning of the axial flow tube relative to the central flow body;
a temperature sensor configured to detect a temperature of a fluid communicated through the valve body;
a pressure sensor configured to detect a pressure of the fluid; and
wiring that extends between the axial displacement sensor and the electronics, the wiring routed through a hollow bolt.

* * * * *